(12) United States Patent
Ishikawa et al.

(10) Patent No.: US 10,041,554 B2
(45) Date of Patent: Aug. 7, 2018

(54) PAD ASSEMBLY FOR DISC BRAKE

(71) Applicant: AKEBONO BRAKE INDUSTRY CO., LTD., Chuo-ku, Tokyo (JP)

(72) Inventors: Hiroyasu Ishikawa, Tokyo (JP); Akiyuki Tajima, Tokyo (JP); Kohei Bando, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/315,040

(22) PCT Filed: Jun. 9, 2015

(86) PCT No.: PCT/JP2015/066643
§ 371 (c)(1),
(2) Date: Nov. 30, 2016

(87) PCT Pub. No.: WO2015/190495
PCT Pub. Date: Dec. 17, 2015

(65) Prior Publication Data
US 2017/0191540 A1  Jul. 6, 2017

(30) Foreign Application Priority Data

Jun. 9, 2014  (JP) ................................. 2014-118648

(51) Int. Cl.
*F16D 65/40* (2006.01)
*F16D 65/38* (2006.01)
*F16D 65/092* (2006.01)

(52) U.S. Cl.
CPC ........... *F16D 65/40* (2013.01); *F16D 65/092* (2013.01); *F16D 65/38* (2013.01)

(58) Field of Classification Search
CPC ......... F16D 65/40; F16D 65/38; F16D 65/092
(Continued)

(56) References Cited

U.S. PATENT DOCUMENTS 4,995,482 A * 2/1991 Kobayashi ............ F16D 55/227
188/264 G
5,975,252 A * 11/1999 Suzuki .................. F16D 55/227
188/1.11 W
(Continued)

FOREIGN PATENT DOCUMENTS

CN  1749592 A  3/2006
JP  H03-118328 U  12/1991
(Continued)

OTHER PUBLICATIONS

Machine Translation in English for JP 3-118328 U; 3 pages; Retrieve Date: Oct. 2, 2017.*
(Continued)

*Primary Examiner* — Thomas J Williams
*Assistant Examiner* — Mariano Sy
(74) *Attorney, Agent, or Firm* — Drinker Biddle & Reath LLP

(57) ABSTRACT

An engaging projection formed on a back surface of a pressure plate is inserted into an engaging hole formed in an outside shim plate. A flat surface parts of the engaging projection constituting a side surface thereof are opposed to a linear parts of the engaging hole constituting an inner peripheral edge thereof. When the outside shim plate exists at a neutral position with respect to the pressure plate, the flat surface parts and linear parts are slightly inclined with respect to each other. A rotation of the outside shim plate about an axis of a piston based on a rotation force applied from a leading end face of the piston to the outside shim plate is regulated by line contact between the flat surface parts and linear parts.

5 Claims, 13 Drawing Sheets

(58) Field of Classification Search
USPC ....... 188/73.31, 73.37, 73.38, 250 R, 251 A; D12/180
See application file for complete search history.

(56) References Cited

U.S. PATENT DOCUMENTS

| | | | | |
|---|---|---|---|---|
| 6,170,620 | B1* | 1/2001 | Akita | F16D 65/0006 188/251 A |
| 6,298,956 | B1* | 10/2001 | Gerhardt | F16D 65/0006 188/73.35 |
| 7,370,736 | B2* | 5/2008 | Anda | F16D 65/0006 188/250 E |
| 7,926,627 | B2* | 4/2011 | Wake | F16D 65/092 188/250 B |
| 8,544,618 | B2* | 10/2013 | Klimt | F16D 65/0006 188/250 B |
| 8,794,397 | B2* | 8/2014 | Crippa | F16D 65/092 188/250 B |
| 9,664,244 | B2* | 5/2017 | Osada | F16D 65/0971 |
| 9,759,277 | B2* | 9/2017 | Kobayashi | F16D 65/0006 |
| 2004/0134725 | A1 | 7/2004 | Bosco et al. | |
| 2006/0054430 | A1 | 3/2006 | Maehara | |
| 2006/0157307 | A1 | 7/2006 | Tsurumi et al. | |
| 2007/0272502 | A1 | 11/2007 | Kobayashi et al. | |
| 2014/0360822 | A1 | 12/2014 | Kobayashi et al. | |

FOREIGN PATENT DOCUMENTS

| | | |
|---|---|---|
| JP | A-H07-293608 | 11/1995 |
| JP | 2005-315422 A | 11/2005 |
| JP | 2006-200560 A | 8/2006 |
| JP | 2007-315541 A | 12/2007 |
| WO | WO-2013/039174 A1 | 3/2013 |

OTHER PUBLICATIONS

Extended European Search Report dated Jan. 16, 2018 in corresponding European patent application 15806897.3 (5 pages).
Chinese Office Action, along with its English-language translation, dated May 17, 2018 that issued Chinese patent application No. 201580031157.3 attached.

* cited by examiner

PAD ASSEMBLY FOR DISC BRAKE

TECHNICAL FIELD

This invention relates to an improvement in a pad assembly for a disc brake.

BACKGROUND ART

A disc brake to be used to brake a vehicle is structured such that a pair of pads are arranged across a rotor rotatable together with a wheel and, in braking, the two pads are pressed against the axial-direction two side surfaces of the rotor. The basic structure of such disc brake includes two kinds of structures, that is, a floating type structure and an opposed piston type structure. Of these two disc brakes, in the floating type disc brake, a caliper with a piston built therein on the inner side is axially shiftably supported on a support supporting the paired pads axially shiftably. In braking, the piston presses the inner side pad against the inner side surface of the rotor and, as a reaction of this, the caliper is shifted toward the inner side. And, a caliper pawl part formed in the outer side end of the caliper presses the outer side pad against the outer side surface of the rotor. Also, in the opposed piston type disc brake, multiple pistons are disposed on a caliper with a pair of pads axially shiftably supported thereon in such a manner that the pistons are arranged on the axial-direction two sides of the rotor. In braking, the pistons press the two pads against the axial-direction two side surfaces of the rotor. In each type, the two pads are formed by attaching linings to the front surface of a pressure plate having sufficient rigidity. And, in braking, the back surface of the pressure plate is pressed by the piston or the caliper pawl part, whereby the front surfaces of the linings and the axial-direction two side surfaces of the rotor are caused to rub each other.

Here, in this specification and Claims, terms [axial direction], [circumferential direction] and [radial direction] respectively mean the axial direction, circumferential direction and radial direction of the rotor in a state where the disc brake pad assembly is assembled to the disc brake, unless otherwise stated. Also, the term [peripheral edge] means the inner peripheral edge or outer peripheral edge of the rotor with respect to the radial direction thereof.

In the disc brake of each structure, in braking, the rotor is strongly held from the axial-direction two sides by the paired pads and is braked by a friction force applied to the contact portion between the linings constituting the two pads and the axial-direction two side surfaces of the rotor. In such braking, the portion to which such friction force is applied and the portions where the piston or the caliper pawl part press the two pads are shifted from each other along the axial direction by an amount equivalent to the thickness of the two pads; and, due to such shift, the attitudes of the two pads are easy to be unstable. When the attitudes of the two pads are unstable in braking, the behaviors of the two pads are hard to be smooth and thus they are vibrated, whereby there are produced noises called "squeak" and the uneven wear of the lining is easy to increase greatly.

In order to relieve such squeak and uneven wear, conventionally, it has been widely known to hold a shim plate between the back surface of a pressure plate constituting a pad and the leading end face of a piston or the inside surface of a caliper pawl part which operate as a pressure surface for pressing the back surface. Such shim plate has a single plate structure constituted of a single plate and, for enhancement in the relieving effect of the squeak and uneven wear, there has been also widely employed a two-plate structure in which an inside shim plate and an outside shim plate are superimposed on each other. Also, whether a single plate structure or a two-plate structure, locking pieces formed in the multiple locations of the inside and outside two peripheral edges of the shim plate are engaged with the inside and outside two peripheral edges of the pressure plate, whereby the shim plate is supported on the back surface side of the pressure plate.

The patent document 1 discloses, as a disc brake pad assembly, a structure as shown in FIGS. 12~14. In this conventional structure, a shim plate 5 constituted of an inside shim plate 3 and an outside shim plate 4 is mounted on the back surface of a pressure plate 2 constituting a pad 1. In the pad 1, a lining 6 is fixedly attached to the front surface (the surface to be opposed to the side surface of the rotor when the pad 1 is assembled to the disc brake) of the pressure plate 2 by such a large connecting force that can prevent it from being shifted due to a brake torque applied thereto in braking. The inside shim plate 3 is made of a metal plate such as a stainless steel plate and includes a flat plate-shaped inside main body 7 and multiple inside locking pieces 8$a$, 8$b$, 8$c$. Also, the inside main body 7 includes multiple open holes 9, 9 used to hold grease therein. Also, of the inside and outside two peripheral edges of the pressure plate 2, the outer pressure edge includes a locking recess 10 in the circumferential direction central part thereof, while the inner peripheral edge includes a pair of steps 11, 11 formed near to the circumferential direction two ends thereof. While, of the inside locking pieces 8$a$, 8$b$, 8$c$ of the inside shim plate 3, the inside locking piece 8$a$ on the outside diameter side is engaged with the locking recess 10 and the inside locking pieces 8$b$, 8$c$ on the inside diameter side are engaged with the two steps 11, 11, the pressure plate 2 is sandwiched from the radial-direction two sides thereof by the inside locking pieces 8$a$, 8$b$, 8$c$. In this state, the inside shim plate 3 is mounted on the back side of the pressure plate 2 in such a manner that it is restricted (substantially, prevented) from shifting in the peripheral and radial directions thereof.

Also, the outside shim plate 4 is made of a metal plate such as a stainless steel plate and includes a flat plate-shaped outside main body 12 and multiple outside locking pieces 13$a$, 13$b$, 13$c$. In this outside shim plate 4, while the outside locking pieces 13$a$, 13$b$, 13$c$ are superimposed on the inside locking pieces 8$a$, 8$b$, 8$c$ respectively, the outside main body 12 is superimposed on the inside main body 7. In this state, the outside shim plate 4 is assembled to the inside shim plate 3 in such a manner that it can shift in the circumferential direction. Thus, the circumferential direction width dimension of the outside locking piece 13$a$ is set smaller than those of the locking recess 10 and the inside locking piece 8$a$, while the distance between the mutually opposed circumferential direction outside edges of the outside locking pieces 13$b$ and 13$c$ is set smaller than the distance between the two steps 11 and 11.

Here, it has also been conventionally proposed to use the disc brake pad assembly having the above structure while it is incorporated into an electric disc brake such as a disc brake equipped with an electric parking mechanism. In this electric disc brake, there has been widely employed a structure in which a piston fitted in a cylinder is pushed out toward a pad arranged on the inner side by a conversion mechanism such as a feed screw mechanism for converting the rotation motion of an electric motor to linear motion. Also, to stop the rotation of the piston and receive a rotation force transmitted to the piston by the conversion mechanism, there has been used a technology that a recess is formed in the leading end face of the piston and a dowel formed on the back surface of the pressure plate of a pad arranged on the inner side is engaged into the recess. Thus, when the disc brake pad assembly having the above structure is used while it is incorporated into the electric disc brake, a notch is formed in a portion of a shim plate covering the back surface of the pressure plate, whereby the dowel formed on the back surface of the pressure plate is engaged into the recess formed in the leading end face of the piston.

Meanwhile, when the above-mentioned dowel and recess rotation preventive mechanism is employed, for reason of complicated control of the electric motor or other, the inventors et al. have pushed forward a study of a structure which omits the dowel and recess but uses a friction force or the like acting on the piston to stop rotation thereof. And, in this case, even when the disc brake pad assembly is used, the rotation stop structure using the dowel and recess is not provided but there is proposed a structure that the leading end face of the piston is contacted with the back surface of a shim plate constituting the disc brake pad assembly. However, when this structure is employed simply, there is a possibility that the following problems can occur.

That is, as shown in FIG. 14, in braking, a rotation force is transmitted through the leading end face of a piston 14 to the back surface of an outside shim plate 4 against which the leading end face of a piston 14 is pressed. And, in a disc brake pad assembly of a conventional structure, such rotation force is received by any one of engaged portions between the outside locking pieces 13a, 13b, 13c provided on the peripheral edge of the outside shim plate 4 and the peripheral edge (locking recess 10 and steps 11, 11) of the pressure plate 2. And, the outside shim plate 4 is restricted from rotating relative to the pressure plate 2 about the axis O of the piston 14. Thus, excessive stress is applied to the outside locking pieces 13a, 13b, 13c, thereby raising a possibility that they can be plastically deformed or can be damaged, for example, can be broken through long use.

PRIOR ART DOCUMENT

Patent Document

Patent Document 1: JP-A-2006-200560

SUMMARY OF THE INVENTION

Problems that the Invention is to Solve

The invention, in view of the above circumstances, has an object to provide a structure of a pad assembly for a disc brake which, even when it is used while it is incorporated into an electric disc brake, can effectively prevent locking pieces against deformation and damage.

Means for Solving the Problems

The object of the invention can be attained by the following structures.

(1) A disc brake pad assembly, comprising: a pad constituted of a pressure plate with a lining fixedly attached to the front surface thereof, and arranged opposed to the axial-direction side surface of a rotor; and, a shim plate having a back surface to be pressed by the leading end face of a piston, the shim plate including a flat plate-shaped main body and a locking piece folded from the peripheral edge of the main body toward the pressure plate, and the locking piece being engaged with the peripheral edge of the pressure plate in a state where the front surface of the main body is superimposed directly or through the other shim plate on the back surface of the pressure plate, wherein the pressure plate includes, in such part of the back surface thereof as is shifted from the part thereof opposed to (axially superimposed on) the leading end face of the piston, an engaging projection projecting in the axial direction of the rotor, the engaging projection is inserted into an engaging hole formed in such part of the main body of the shim plate as is shifted from the part thereof to be contacted with the leading end face of the piston in a state where the flat surface part of the engaging projection constituting the side surface thereof and the linear part of the engaging hole constituting the inner peripheral edge thereof are opposed to each other, and the flat surface part and the linear part are inclined to each other (here, when the other shim plate is held between the pressure plate and shim plate, the leading end of the engaging projection inserted through a through hole or a notch formed in the other shim plate is inserted into an engaging hole formed in the shim plate) with the shim plate existing at a neutral position with respect to the pressure plate; of the shifting movement of the shim plate relative to the pressure plate, the movement in the circumferential direction of the rotor is regulated by the engaged portion between the locking piece and the peripheral edge of the pressure plate; and, of the rotation of the shim plate about the axis of the piston, the rotation in a direction acting on the piston at least in braking is regulated by line contact between the flat surface part and the linear part.

(2) A disc brake pad assembly according to the above (1) structure, wherein, in a state where the shim plate exists at a neutral position with respect to the pressure plate, the inclination angle between the flat surface part and linear part is in the range of 0° (preferably, 0.5°)~15°.

(3) A disc brake pad assembly according to any one of the structures (1) and (2), further including a folded part folded from the inner peripheral edge of the engaging hole toward the opposite side to the pressure plate, wherein the inside surface of the folded part serves as the linear part.

(4) A disc brake pad assembly according to any one of the structures (1)~(3), wherein the engaging projection is formed in such circumferential direction two side parts of the back surface of the pressure plate as are disposed across the part thereof opposed to the leading end face of the piston, and the engaging hole is formed in such circumferential direction two side parts of the main body of the shim plate as are disposed across the part thereof to be contacted with the leading end face of the piston.

(5) A disc brake pad assembly according to any one of the structures (1)~(4), wherein a pair of flat surface parts are formed in the side surface of the engaging projection, a pair of linear parts are formed in the inner peripheral edge of the engaging hole, and the rotation of the shim plate in both directions about the axis of the piston is regulated by line contact between the flat surface parts and the linear parts.

(6) A disc brake pad assembly according to any one of the structures (1)~(5), wherein the locking pieces are formed in the outer and inner peripheral edges of the main body at least apiece.

Effects of the Invention

According to the above-structured disc brake pad assembly of the invention, even when it is used while it is incorporated into an electric disc brake, the locking piece can be effectively prevented against deformation and damage.

That is, in a state where the engaging projection formed on the back surface of the pressure plate is inserted into the engaging hole formed in the main body of the shim plate, the flat surface part constituting the side surface of the engaging projection and the linear part constituting the inner peripheral edge of the engaging hole are opposed to each other; and, in a state where the shim plate exists at a neutral position with respect to the pressure plate, the flat surface part and linear part are inclined to each other. And, in braking, the rotation of the shim plate about the axis of the piston based on a rotation force applied from the leading end face of the piston constituting the electric disc brake to the shim plate is regulated by line contact between the flat surface part and linear part. Thus, in this invention, the rotation force applied from the leading end face of the piston to the shim plate may not be supported by the engaged portion between the locking piece formed in the peripheral edge of this shim plate and the peripheral edge of the pressure plate, or such supporting force may be small. Therefore, according to the invention, the locking piece can be effectively prevented against plastic deformation or damage such as breakage.

Further, in this invention, the rotation force applied from the leading end surface of the piston to the shim plate is supported not by the portion to be point contacted but by the portion to be line contacted between the flat surface part and linear part, thereby enabling suppression of stress acting on the engaging projection. This can effectively prevent the side surface of the engaging projection and the inner peripheral edge of the engaging hole against serious wear or deformation.

Also, according to the invention disclosed in the above (3) structure, a large contact area can be secured between the flat surface part and linear part, thereby enabling reduction in the contact surface pressure acting on the two parts. This can further effectively prevent the side surface of the engaging projection and the inner peripheral edge of the engaging hole against serious wear or deformation.

Further, according to the invention disclosed in the above (5) structure, in braking removal time, the rotation of the shim plate about the axis of the piston based on a rotation force applied from the leading end face of the piston constituting the electric disc brake to the shim plate can be regulated by bringing the flat surface part and linear part into line contact with each other. Thus, the locking piece can be prevented from being deformed or damaged by the force acting on the shim plate in braking removal time.

MODE FOR CARRYING OUT THE INVENTION

First Embodiment

Figure 1:
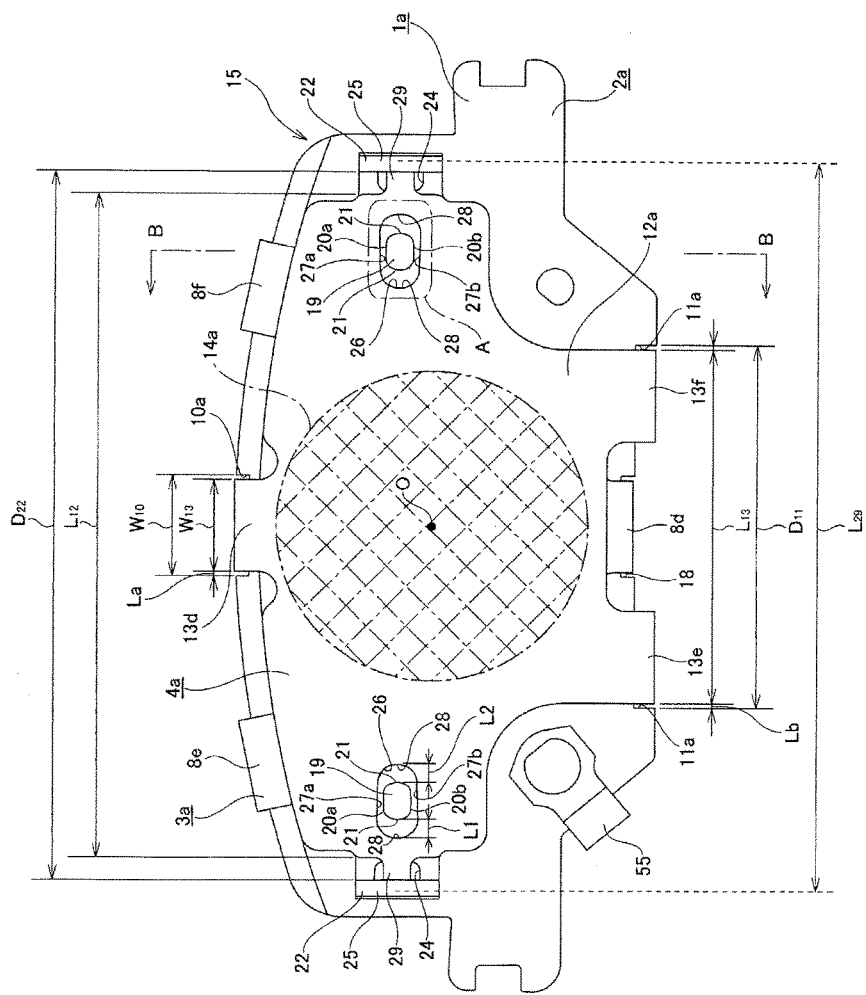
FIG. 1 is an orthographic view of a pad assembly according to a first embodiment of the invention, when viewed from behind.

FIGS. 1 to 8 show a first embodiment of the invention. A disc brake pad assembly 15 of this embodiment is used while it is incorporated into a disc brake 16 equipped with an electric parking mechanism, and includes a pad (inner pad) 1a, an inside shim plate 3a corresponding to the other shim plate stated in Claims, and an outside shim plate 4a corresponding to a shim plate stated in Claims. The pad 1a is formed by fixedly attaching a lining 6 to the front surface of a pressure plate 2a and is arranged opposed to the axial-direction side surface of a rotor 17.

The pressure plate 2a includes a locking recess 10a formed in the circumferential direction center of the outer peripheral edge thereof, a pair of steps 11a, 11a formed near to the circumferential direction two ends of the inner peripheral edge thereof, and an inside diameter side locking recess 18 formed in the circumferential direction center of the inner peripheral edge thereof. Also, in this embodiment, of the back surface of the pressure plate 2a, in the circumferential direction two side portions across a portion (oblique cross portion shown in FIG. 1) of the back surface opposed to (superimposed on in the axial direction) the leading end face of the piston 14a, there are provided engaging projections (dowels) 19, 19 projecting in the axial direction of the rotor 17 apiece. These two engaging projections 19, 19 are formed more adjacently to the radial-direction outside than the pad center position in a direction parallel to the rotation direction (tangential direction) of the rotor 17 in the circumferential direction center of the pad 1a. Also, the engaging projections 19, 19 each is formed in an oval projection (long in the circumferential direction) having a section shape (end face shape) in which a circumferential direction width dimension $L_{19}$ is larger than a radial-direction width dimension $H_{19}$. Therefore, the side surfaces (peripheral surfaces) of the two engaging projections 19, 19 are structured such that a pair of flat surface parts 20a, 20b arranged parallel to each other in the radial-direction two side portions and a pair of convex arc surface parts 21, 21 arranged in the circumferential direction two side portions continue with each other. Also, the projection amount of each of the engaging projections 19, 19 with respect to the axial direction is set larger than a dimension provided when the inside and outside shim plates 3a and 4a are superimposed on each other. Also, the leading end faces of the two engaging projections 19, 19 are formed as convex curved surfaces the centers of which project most along the axial direction.

Also, the inside shim plate 3a is produced by punching and bending by press working a corrosion resistant and elastic metal plate such as a stainless spring steel plate or a stainless spring steel plate with the surface thereof opposed to the back surface of the pressure plate 2a coated with rubber. This inside shim plate 3a includes a flat plate-shaped inside main body 7a, a pair of locking folded parts 22, 22 folded substantially at right angles toward the opposite side of the pressure plate 2a from the circumferential direction two ends of the inside main body 7a, and three inside locking pieces 8d, 8e and 8f.

In this embodiment, of the inside main body 7a, in the circumferential direction two side parts existing across a part opposed (matched) to the leading end face of the piston 14a, there are formed through holes 23, 23 for insertion of the engaging projections 19, 19. In the illustrated example, the through holes 23, 23 have an oval shape (a shape long in the circumferential direction) identical with engaging holes 26, 26 (which is discussed later). However, the shape and size thereof are not limitative so long as they are capable of insertion of the engaging projections 19, 19. Also, in such portion of the inside main body 7a as intervenes between the two through holes 23, 23 along the circumferential direction, there are formed multiple (in the illustrated example, 2) open holes 9, 9 (long in the radial direction) for retaining therein grease for lubrication.

Also, in such width direction (radial direction) central portions of the locking bent parts 22, 22 constituting the inside shim plate 3a as range from the base end portions to the middle portions, there are formed locking open holes 24, 24, respectively. Also, in such portions of the two locking bent parts 22, 22 as exist near to the leading ends thereof, there are formed guide inclination parts 25, 25, respectively. The inclination direction of the two guide inclination parts 25, 25 is defined as a direction where their mutual distance increases as they go toward their respective leading end edges.

Further, of the two inner and outer peripheral edges of the inside main body 7a, in a total of three portions constituted of the circumferential direction central portion of the inner peripheral edge and the two portions of the outer peripheral edge existing near to the circumferential direction two ends thereof, there are formed the inside locking pieces 8d, 8e and 8f which are respectively folded toward the pressure plate 2a. The respective front half sections of the inside locking pieces 8d, 8e and 8f are folded to a state where the angles relative to the inside main body 7a provide acute angles, and they can be mounted onto the back surface side of the pressure plate 2a the front half parts while being elastically deformed in a direction to increase their mutual distance in the radial direction.

When mounting the above-structured inside shim plate 3a onto the pressure plate 2a, the inside main body 7a is contacted with the back surface of the pressure plate 2a while the front half section inner surface of the inside locking piece 8d is elastically contacted with the inside locking recess 18 of the inner peripheral edge of the pressure plate 2a and the front half section inner surfaces of the two inside locking pieces 8e, 8f are elastically contacted with such two positions of the pressure plate 2a as exist near to the circumferential direction two ends of the outer peripheral edge of the pressure plate 2a. And, in the thus-mounted state, the shifting movement of the inside shim plate 3a in the radial and circumferential directions is limited by a friction force acting between the inside shim 3a and the back surface of the pressure plate 2a, engagement (on a non-linear line) between the two inside locking pieces 8e, 8f and the outer peripheral edge of the pressure plate 2a, and the like.

Meanwhile, the outside shim plate 4a is formed by punching and bending a corrosion resistant and elastic metal plate such as a stainless spring steel plate by press working, and includes a flat plate-shaped outside main body 12a and three outside locking pieces 13d, 13e and 13f.

Figure 2:
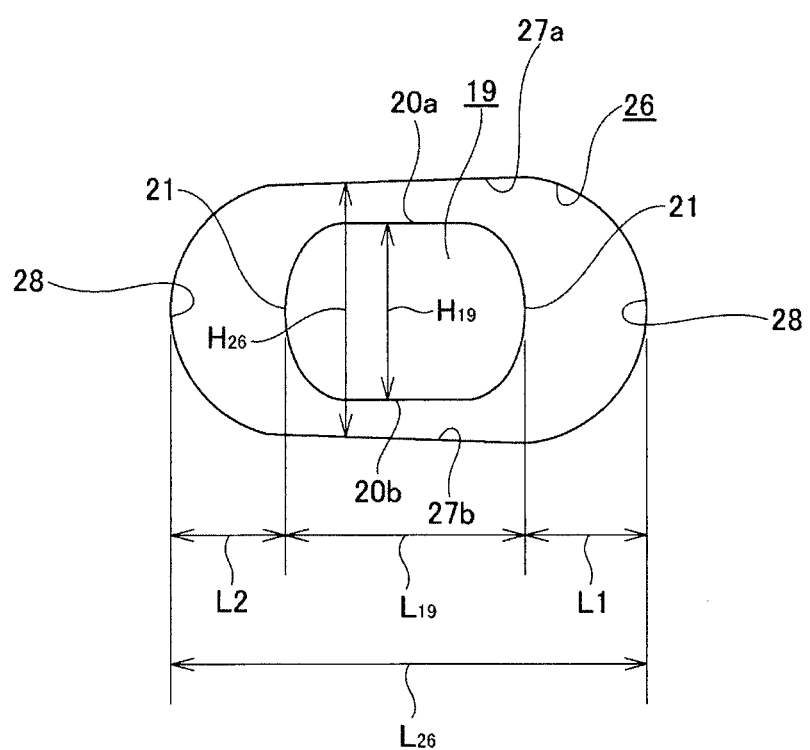
FIG. 2 is an enlarged view of the A part of FIG. 1.
Figure 3:
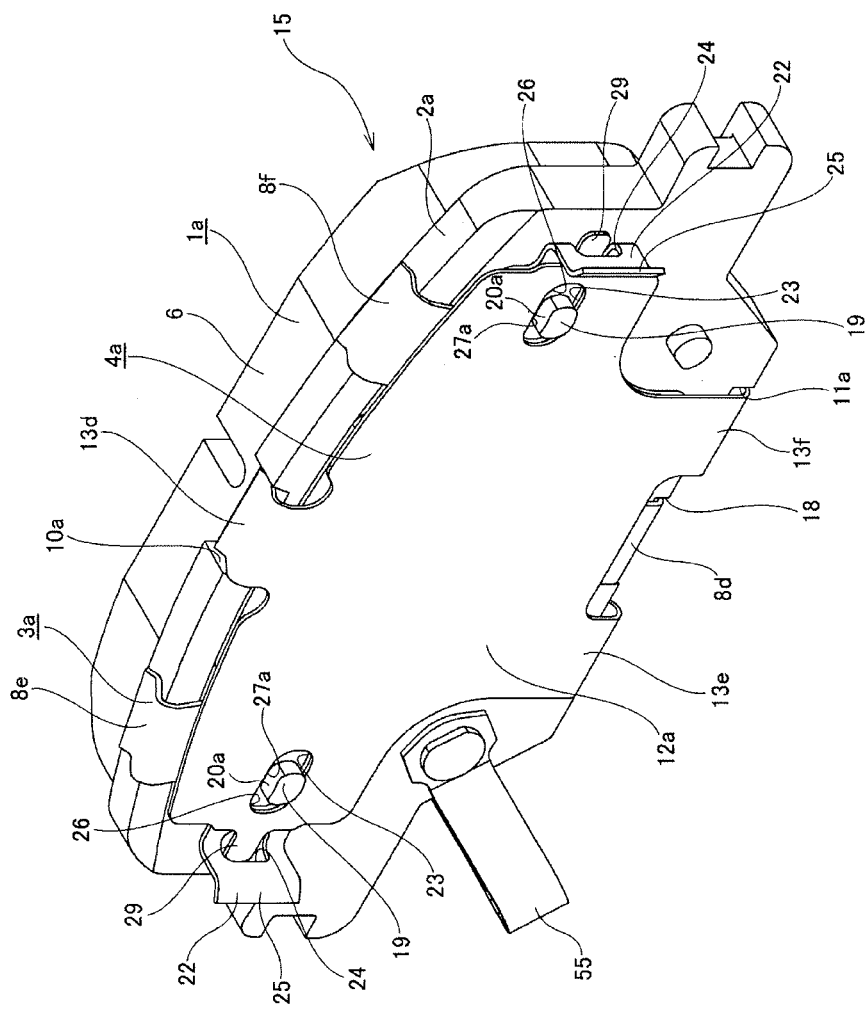
FIG. 3 is a perspective view of the pad assembly shown in FIG. 1, when viewed from behind and radial-direction outside.
Figure 4:
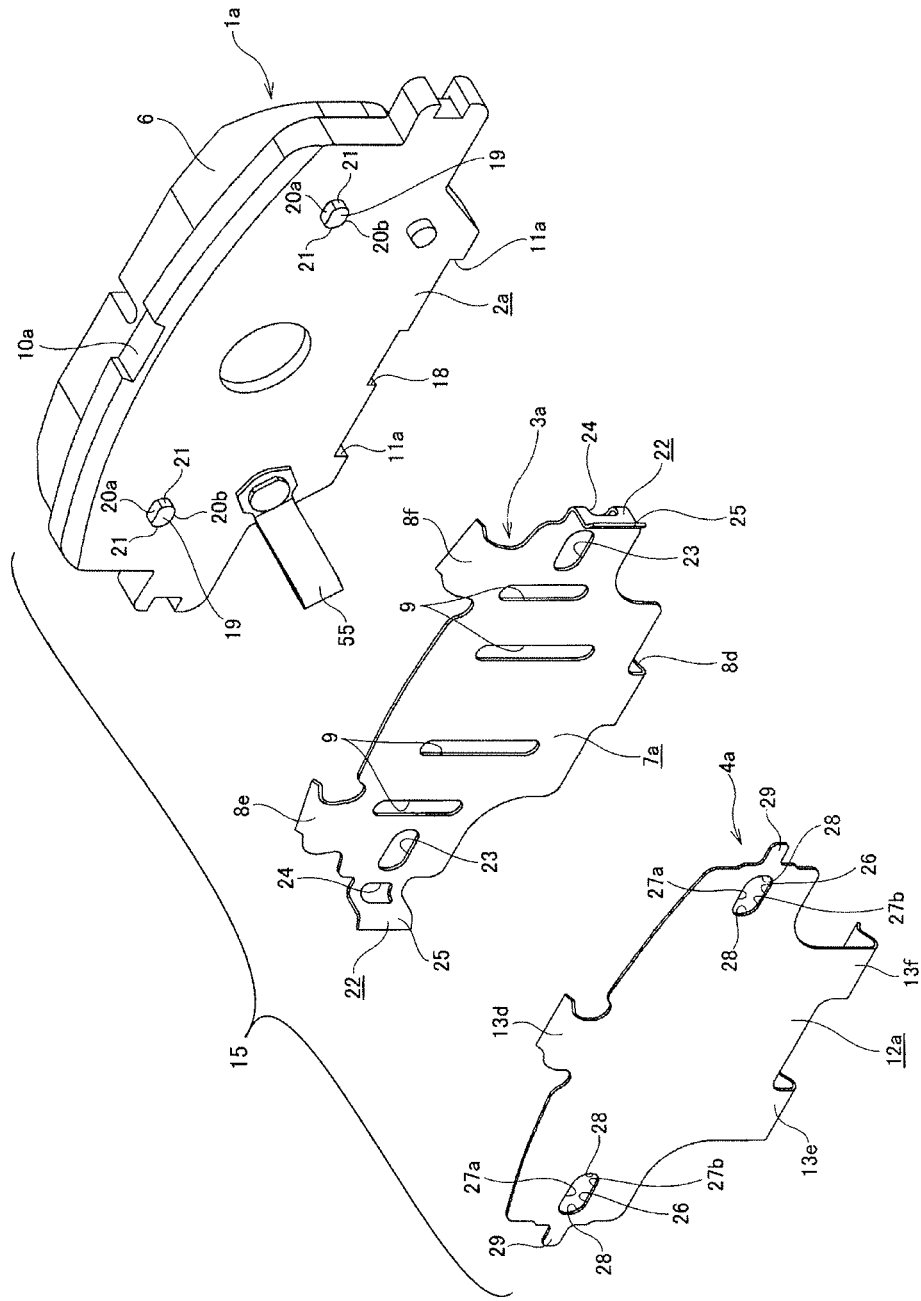
FIG. 4 is an exploded perspective view of the pad assembly shown in FIG. 3.
Figure 5:
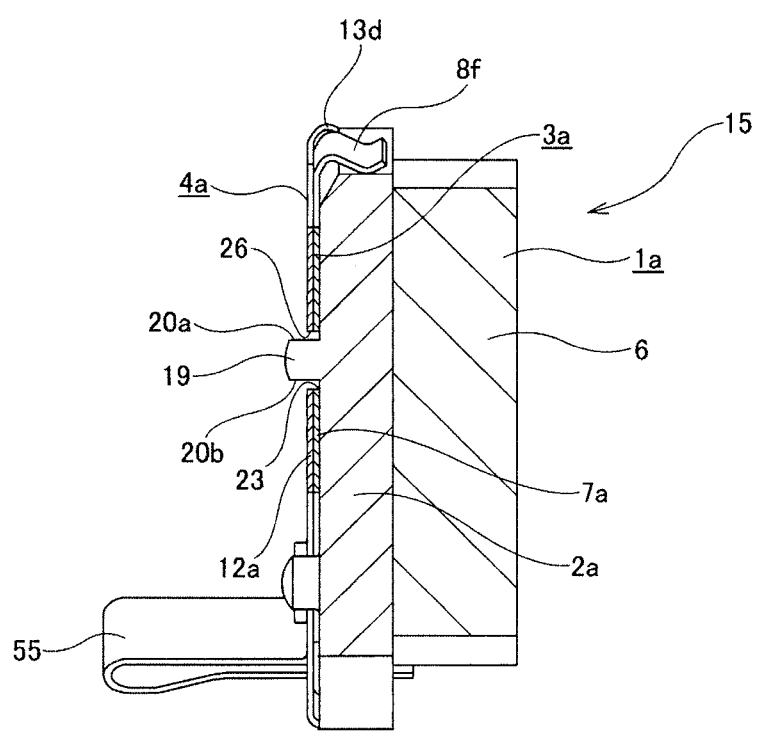
FIG. 5 is a section view taken along the B-B arrows of FIG. 1.

In this embodiment, of the outside main body 12a, in the circumferential direction two parts existing across a part to be contacted with the leading end face of the piston 14a, there are formed engaging holes 26, 26 for insertion of the engaging projections 19, 19. As shown in FIG. 2, the two engaging projections 19, 19 are respectively formed in an oval shape (long in the circumferential direction) in which the circumferential direction dimension is larger than the radial-direction dimension, while the inner peripheral edge of each engaging hole 26 is formed such that a pair of linear parts 27a, 27b respectively arranged in the two radial-direction parts and a pair of concave arc parts 28, 28 respectively arranged in the circumferential direction two parts continue with each other. Also, in this embodiment, the two linear parts 27a, 27b are slightly inclined in a direction to approach each other along the radial direction as they go toward the center side (the side of the axis O of the piston 14a) along the circumferential direction. And, in a state where the leading ends of the engaging projections 19, 19 are inserted in the thus-structured engaging holes 26, 26, the plane parts 20a, 20b and the linear parts 27a, 27b are opposed to each other in the radial direction, and the convex arc surface parts 21, 21 and the concave arc parts 28, 28 are opposed to each other in the circumferential direction.

Also, the radial-direction width dimension $H_{26}$ of the engaging holes 26, 26 (the minimum value of the radial-direction width dimension in the part opposed to the engaging projection 19) is set slightly larger than the radial-direction width dimension $H_{19}$ of the engaging projections 19, 19 (as small as possible so long as the engaging projection can be inserted), whereas the circumferential direction width dimension $L_{26}$ of the engaging holes 26, 26 is set sufficiently larger than the circumferential direction width dimension $L_{19}$ of the engaging projections 19, 19. Thus, as shown in FIG. 1, in a state where the outside shim plate 4a exists at a neutral position with respect to the pressure plate 2a, between the plane parts 20a, 20b and the linear parts 27a, 27b, there are respectively formed small clearances in which the width dimension along the radial direction varies gradually along the circumferential direction; and, between the convex arc surface parts 21, 21 and the concave arc parts 28, 28 opposed to each other in the circumferential direction, there are respectively formed circumferential direction clearances (L1, L2) in which the width dimension along the circumferential direction is relatively large). Also, in this embodiment, in a state where the outside shim plate 4a exists at a neutral position with respect to the pressure plate 2a, the inclination angle between the plane parts 20a, 20b and the linear parts 27a, 27b opposed to each other in the radial direction through the small clearances is restricted to the range of 0°~15° (in the illustrated example, 1.5°).

Also, the outside main body 12a includes, in the radial-direction middle portions of the circumferential direction two end edges thereof, locking projection pieces 29, 29 respectively projecting more in the circumferential direction than the radial-direction adjoining portions. And, the distance $L_{29}$ between the leading end edges of the two locking projection pieces 29, 29 is set larger than the clearance $D_{22}$ between the two locking folded parts 22, 22 formed in the circumferential direction two ends of the inside shim plate 3a ($L_{29}>D_{22}$). However, the dimensions $L_{29}$, $D_{22}$ are regulated in the following manner with respect to the guide inclination parts 25, 25. That is, the dimensions of the respective parts are regulated in such a manner that, in the circumferential direction one end edge of the outside main body 12a, in a state where, while the locking projection piece 29 is engaged with the locking open hole 24, the outside main body 12a approaches the inside main body 7a of the shim plate 3a, the leading end edge of the locking projection piece 29 on the circumferential direction other end side is contacted with the guide inclination part 25 formed in the leading end of the locking bent part 22. Also, the circumferential direction length $L_{12}$ of such part of the outside main body 12a as exists between the two locking folded parts 22, 22 and also adjoins the radial-direction two sides of the two locking projection pieces 29, 29 is set slightly smaller than the clearance $D_{22}$ ($L_{12}<D_{22}$).

Further, of the inner and outer two peripheral edges of the outside main body 12a, in a total of three portions including the circumferential direction central portion of the outer peripheral edge and the two such portions of the inner peripheral edge as exist near to the circumferential direction two ends, there are provided the outside locking pieces 13d, 13e and 13f respectively folded toward the pressure plate 2a. In such outside locking pieces 13d, 13e and 13f as well, similarly to the above-mentioned inside locking pieces 8d, 8e and 8f, the front half sections thereof are folded until the angles thereof with respect to the outside main body 12a provide acute angles, whereby they can be mounted onto the back surface side of the pressure plate 2a through the inside shim plate 3a.

In this embodiment, to enable the circumferential direction slight shifting movement of the outside shim plate 4a with respect to the pressure plate 2a, the circumferential direction width $W_{10}$ of the locking recess 10a is set slightly larger than the circumferential direction width $W_{13}$ of the outside locking piece 13d ($W_{10}>W_{13}$). Also, the clearance $D_{11}$ between the two steps 11a, 11a is set slightly larger than the distance $L_{13}$ between the circumferential direction outside edges (opposite side end edges) of the two outside locking pieces 13e and 13f ($D_{11}>L_{13}$).

Also, the circumferential direction shifting movement of the outside shim plate 4a with respect to the pressure plate 2a is regulated by the engaged portion between the circumferential direction side edge of the outside locking piece 13d and the locking recess 10a, or, by the engaged portions between the circumferential direction outside edges of the outside locking pieces 13e, 13f and the steps 11a, 11a, but is not regulated by the engagement between the engaging holes 26, 26 and the engaging projections 19, 19. Therefore, the dimensions of the respective parts are regulated in the following manner. That is, as shown in FIG. 1, in the outside shim plate 4a, in a state where it exists at a neutral position relative to the pressure plate 2a, circumferential direction clearances L1, L2 between the circumferential direction end edges (the top portions of the convex arc surface parts 21) of the engaging projections 19, 19 and the circumferential direction end edges (the bottom portions of the concave arc parts 28) of the two engaging holes 26, 26 are respectively set larger than the size La (($W_{10}-W_{13}$)/2) of the circumferential direction clearance between the circumferential direction side edge of the outside locking piece 13d and the locking recess 10a and the size Lb (($D_{11}-L_{13}$)/2) of the circumferential direction clearance between the circumferential direction outside edges of the outside locking pieces 13e, 13f and the steps 11a, 11a (L1, L2>La, Lb). Thus, in this embodiment, even when the outside shim plate 4a is shifted in the circumferential direction with respect to the pressure plate 2a, the engaging projections 19, 19 and the engaging holes 26, 26 are prevented against contact with each other.

The above-structured outside shim plate 4a is mounted onto the pressure plate 2a in a state where the outside main body 12a thereof is superimposed on the back surface of the pressure plate 2a through the inside main body 7a thereof. And, in this state, the inside shim plate 3a and the outside shim plate 4a are combined with each other in such a manner that they can shift slightly relative to each other in the peripheral and radial directions.

In a state where the two shim plates 3a and 4a are assembled to the pressure plate 2a, the inside shim plate 3a is regulated (substantially prevented) against shifting movement with respect to the pressure plate 2a in the peripheral and radial directions, whereas the outside shim plate 4a is allowed to shift slightly with respect to the pressure plate 2a in the peripheral and radial directions and around the axis O of the piston 14a.

Here, the two shim plates 3a and 4a may also be assembled to the pressure plate 2a after they are previously assembled together, or the inside and outside shim plates 3a and 4a may also be sequentially assembled to the pressure plate 2a.

Also, in this embodiment, on the back surface of the pressure plate 2a, there is mounted a wear indicator 55 formed by bending a long plate-shaped metal thin plate such as a spring steel plate into a substantially U-like shape. Thus, from wear occurring in braking, it is possible to detect that the lining 6 has been worn up to the wear allowance limit thickness.

Figure 6:
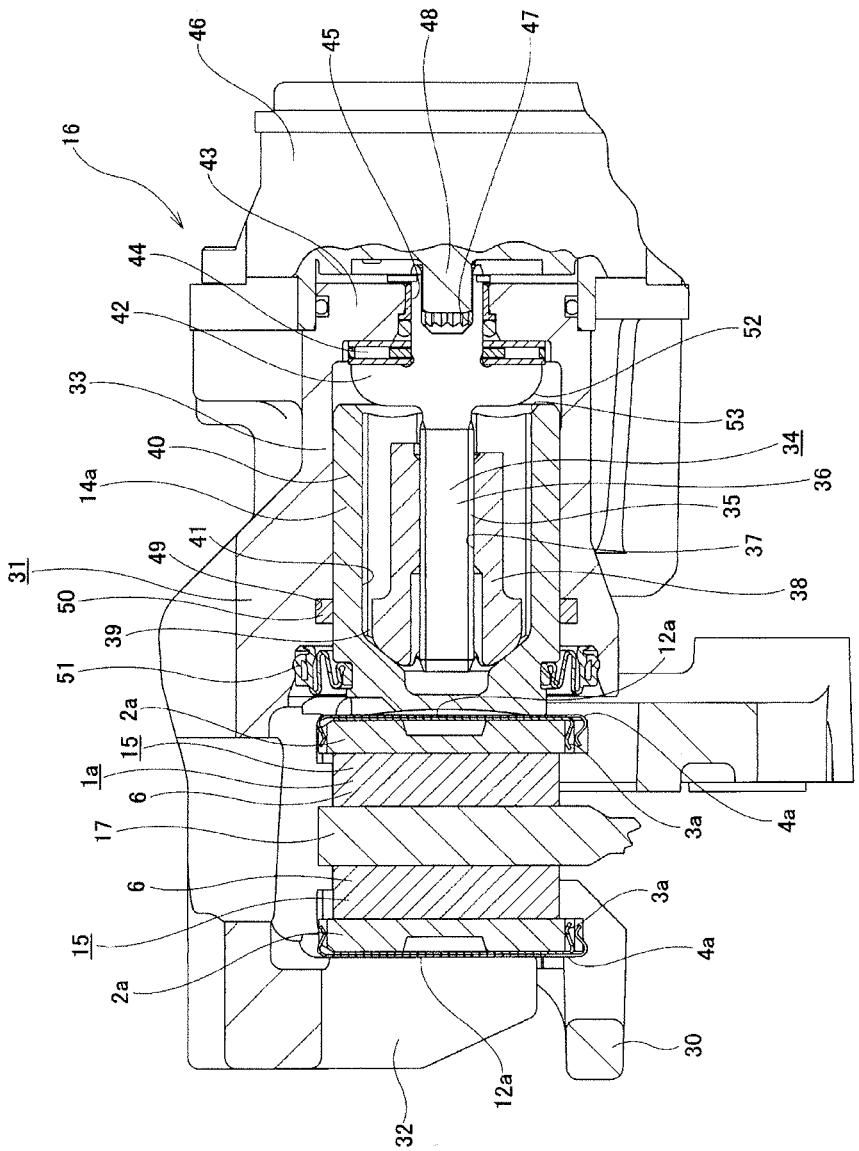
FIG. 6 is a partial section view of a disc brake with an electric parking mechanism, showing a state thereof where the pad assembly of the first embodiment is incorporated therein.

The above-structured disc brake pad assembly 15 of this embodiment, as shown in FIG. 6, is arranged opposed to the inner side surface of the rotor 17 and is incorporated into the disc brake 16 equipped with an electric parking mechanism. Here, in this embodiment, the disc brake pad assembly 15 of this embodiment is arranged also in a portion opposed to the outer side surface of the rotor 17, thereby enabling common use of parts and thus cost reduction. However, on the outer side of the rotor 17, there can also be used a disc brake pad assembly of a conventional structure excluding the engaging projection 19, through hole 23 and engaging hole 26.

The illustrated disc brake 16 with an electric parking mechanism is a floating type disc brake structured such that a caliper 31 incorporating a piston 14a on the inner side is axially shiftably supported by a support 30 on which a pair of disc brake pad assemblies 15, 15 are axially shiftably supported. Also, the support 30 is fixed to a vehicle body in a state where it exists adjacent to the rotor 17 rotatable together with a wheel.

The caliper 31 includes a caliper pawl part 32 in the outer side end and a cylinder part 33 in the inner side end. And, within the cylinder part 33, there is mounted the piston 14a oil tight and axially shiftably. Also, inside the cylinder part 33, there is provided a conversion mechanism (feed screw mechanism) 34 for converting the rotation motion of the output shaft of an electric motor (to be discussed later) to linear motion. The conversion mechanism 34 includes a spindle 36 having a male screw part 35 in the outer peripheral surface thereof and a nut 38 having a female screw part 37 in the inner peripheral surface and screwed to the spindle 36. And, a male spline part 39 formed in the outer peripheral surface of the nut 38 is engaged relatively unrotatably and axially shiftably with a male spline part 41 formed in the inner peripheral surface of a cylindrical part 40 constituting the piston 14a. Also, the spindle 36 includes a flange part 42 in the axial-direction middle part thereof and, between the inner side surface of the flange part 42 and the inner surface (outer side surface) of a bottom part 43 constituting the cylinder part 33, there is provided a thrust needle bearing 44. Also, the inner side end of the spindle 36 is inserted into a communication hole 45 formed to penetrate axially through the central portion of the bottom part 43.

Also, within a casing 46 fixedly supported to the inner side end of the caliper 31, there are stored an electric motor and a reduction gear (neither of which is shown). And, the leading end of an intermediate shaft 48 with a final gear constituting the reduction gear fixed to the periphery thereof is spline engaged into a female spline hole 47 opened in the central portion of the inner side end (base end) of the spindle 36.

Also, in the near-to-outside portion of the inner peripheral surface of the cylinder part 33, there is formed a seal groove 49 having a rectangular-shaped section, and an annular seal member 50 mounted in the seal groove 49 seals between the outer peripheral surface of the piston 14a and the near-to-outside portion of the inner peripheral surface of the cylinder part 33. Also, a space between the opening of the cylinder part 33 and the leading end outer peripheral surface of the piston 14a is closed by a dust cover 51.

Particularly, in this embodiment, between the leading end face of the piston 14a and the inner side disc brake pad assembly 15, there is not employed a rotation preventive structure using a dowel and a recess such as the above-mentioned conventional structure. That is, the leading end face of the piston 14a is simply in contact with the back surface of the outside main body 12a of the outside shim plate 4a constituting the inner side disc brake pad assembly 15. In this embodiment, the piston 14a is prevented against rotation by the friction force acting between the outside shim plate 4a and piston 14a and the friction force given by the annular seal member 50. Thus, in this embodiment, for the piston 14a, a rotation preventive structure based on mechanical engagement is not employed. Thus, in the braking time and braking removal time of the parking brake, the piston 14a rotates slightly relative to the cylinder part 33. Here, in this embodiment, since the braking of a service brake is executed by feeding pressure oil into the cylinder part 33, the piston 14a is prevented against rotation.

Also, in this embodiment, for enhancement in the operation efficiency of the assembling operation of the above-structured disc brake 16 with an electric parking mechanism, the flange part 42 constituting the spindle 36 and the above-mentioned piston 14a are improved. Specifically, in the continuous part between the side surface and outer peripheral surface of the flange part 42, there is formed a convex curved surface part 52 the section of which has a convex arc shape; and, in the inner side end inner peripheral edge of a cylindrical part 40 constituting the piston 14a, there is formed a linear shaped or curved-surface shaped (concave arc shaped) chamfer part 53. And, in the assembling operation of the disc brake 16 with an electric parking mechanism, when the conversion mechanism 34 constituted of a combination of the spindle 36 and the nut 38 is assembled inside the piston 14a with the leading end face of which is placed on an operation table, the convex curved surface part 52 of the flange part 42 is contacted with the chamfer part 53, whereby, using the deadweight of the conversion mechanism 34, the center of the conversion mechanism 34 is allowed to coincide with the center of the piston 14a.

To operate a parking brake by the disc brake 16 with an electric parking mechanism according to this embodiment, a driver may operate a lever or a switch to supply a control current to the electric motor, thereby rotating the output shaft of the electric motor. Such rotation motion is transmitted to the spindle 36 while it is reduced at a specific reduction ratio through the reduction gear. The rotation motion transmitted to the spindle 36, due to threaded engagement between the male screw part 35 of the spindle 36 and the female part 37 of the nut 38, is converted to linear motion to shift the nut 38 toward the rotor 17. Further, the linear motion of the nut 38 shifts the piston 14a toward the rotor 17 (to the left in FIG. 6), thereby pressing the inner side disc brake pad assembly 15 (the lining 6 constituting the pad 1a) against the inner side surface of the rotor 17. Accordingly, as the reaction of this pressing force, the caliper pawl part 32 of the caliper 31 presses the outer side disc brake pad assembly 15 (the lining 6 constituting the pad 1a) against the outer side surface of the rotor 17. On the other hand, to remove the operation of the parking brake, by rotating reversely the electric motor, the piston 14a is shifted in a direction to part apart from the rotor 17, whereby the two disc brake pad assemblies 15, 15 are separated from the rotor 17.

According to the above-structured disc brake pad assembly 15 of this embodiment, even when it is used while incorporated into the disc brake 16 with an electric parking mechanism, the outside locking pieces 13d, 13e, 13f constituting the outside shim plate 4a can be effectively prevented against plastic deformation or damage.

Figure 7:
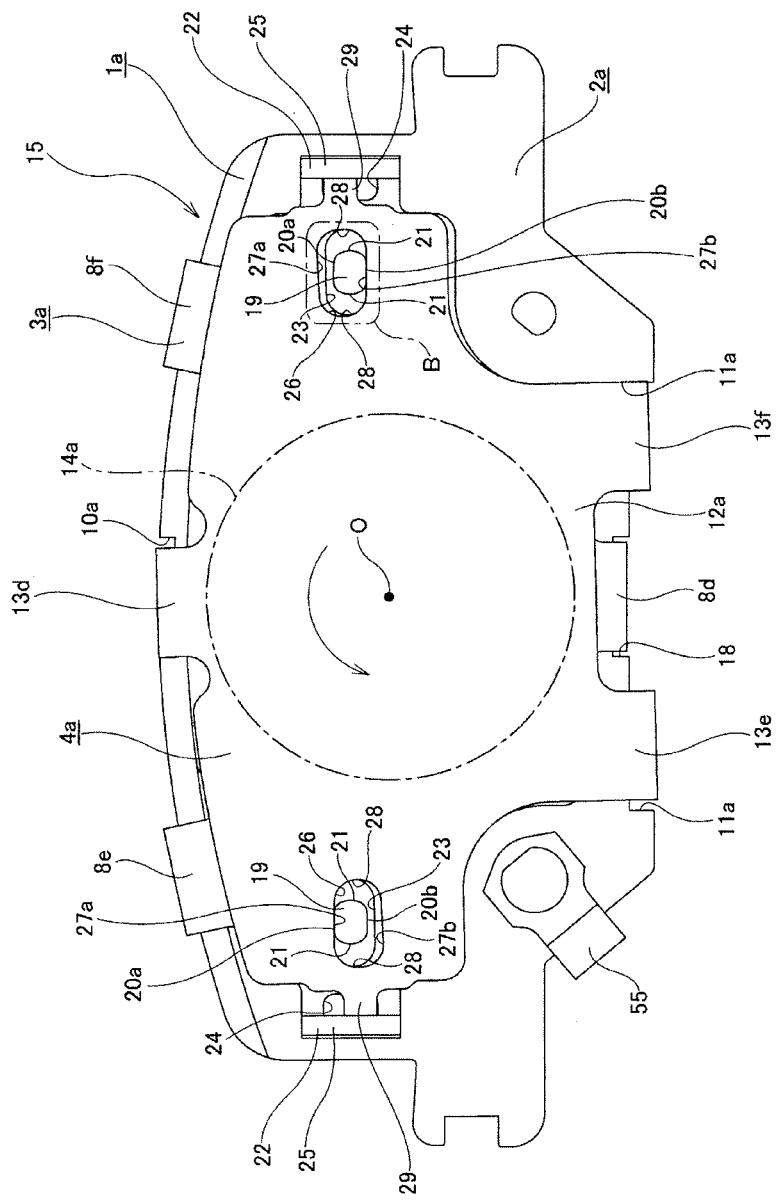
FIG. 7 is a view similar to FIG. 1, showing a state where an outside shim plate rotates counterclockwise when a parking brake is in braking.
Figure 8:
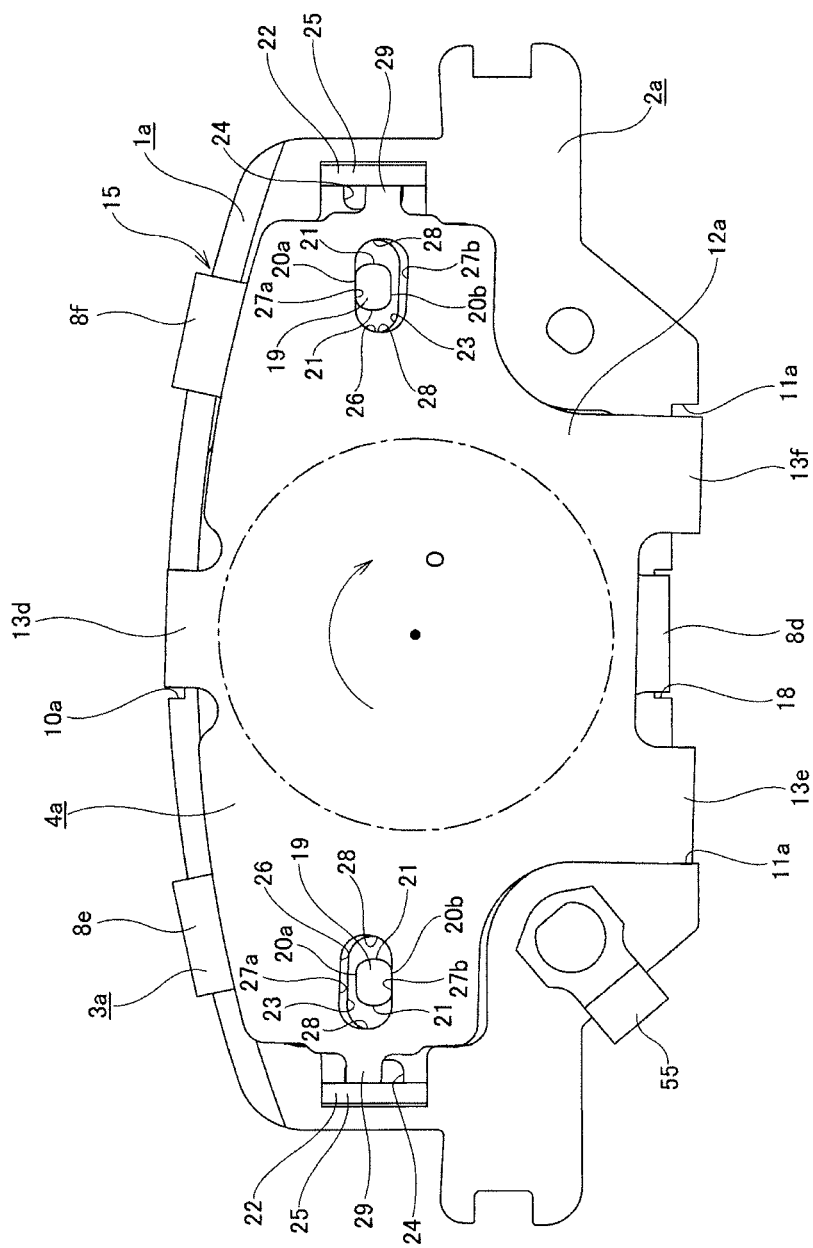
FIG. 8 is a view similar to FIG. 1, showing a state where the outside shim plate rotates clockwise when the parking brake is in braking removal time.

That is, in this embodiment, in a state where the engaging projections 19, 19 formed in the pressure plate 2a are inserted into the engaging holes 26, 26 formed in the outside shim plate 4a, a pair of flat surface parts 20a, 20b constituting the side surfaces of the engaging projections 19, 19 and a pair of linear parts 27a, 27b constituting the inner peripheral edges of the engaging holes 26, 26 are opposed to each other; and, in a state where the outside shim plate 4a exists at a neutral position with respect to the pressure plate 2a, the flat surface parts 20a, 20b and the linear parts 27a, 27b are inclined to each other. And, while the parking brake is in braking, the counterclockwise rotation of the outside shim plate 4a about the axis O based on a rotation force applied from the leading end face of the piston 14a is regulated, as shown in FIG. 7, because simultaneously when the linear part 27b constituting the engaging hole 26 on the circumferential direction one end side (in FIG. 7, the right end side) and the flat surface part 20b constituting the side surface of the engaging projection 19 inserted into this engaging hole 26 are line contacted with each other, the linear part 27a constituting the engaging hole 26 on the circumferential direction other end side (in FIG. 7, the left end side) and the flat surface part 20a constituting the side surface of the engaging projection 19 inserted into this engaging hole 26 are line contacted with each other. Also, in the braking removal time of the parking brake, the clockwise rotation of the outside shim plate 4a about the axis O is regulated, as shown in FIG. 8, because, simultaneously when the linear part 27a constituting the engaging hole 26 on the circumferential direction one end side and the flat surface part 20a constituting the side surface of the engaging projection 19 inserted into this engaging hole 26 are line contacted with each other, the linear part 27b constituting the circumferential direction other end side and the flat surface part 20b constituting the side surface of the engaging projection 19 inserted into this engaging hole 26 are line contacted with each other.

As described above, in this embodiment, in any case of the braking time and braking removal time of the parking brake, the rotation force applied from the leading end face of the piston 14a to the outside shim plate 4a may not be supported by the engaged parts between the outside locking pieces 13d, 13e, 13f formed in the peripheral edge of this outside shim plate 4a and the peripheral edge of the pressure plate 2a, or, when supported, the supporting force can be reduced. Therefore, according to the structure of this embodiment, the outside locking pieces 13d, 13e, 13f can be effectively prevented against plastic deformation or damage such as breakage.

Further, in this embodiment, since the rotation force applied from the leading end face of the piston 14a to the outside shim plate 4a is supported not by a portion to be point contacted but by a portion to be line contacted between the flat surface parts 20a, 20b and the linear parts 27a, 27b, stress acting on the engaging projections 19, 19 can be suppressed. Moreover, in this embodiment, the rotation force is supported by the two contact portions existing on both sides in the circumferential direction, thereby enabling reduction by half of the stress acting on the engaging projections 19, 19. Thus, the disc brake pad assembly of this embodiment can effectively prevent the side surfaces of the engaging projections 19, 19 and the inner peripheral edges of the engaging holes 26, 26 against serious wear or deformation.

Second Embodiment

Figure 9:
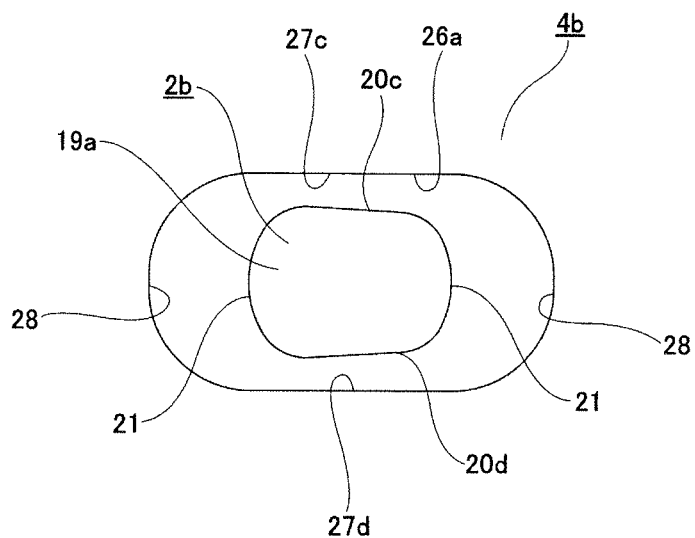
FIG. 9 is an enlarged view of a part corresponding to the A part of FIG. 1 according to a second embodiment of the invention.

FIG. 9 shows a second embodiment of the invention. In this embodiment, the inner peripheral edge of an engaging hole 26a formed in an outside shim plate 4b is structured in such a manner that a pair of mutually parallel linear parts 27c, 27d arranged in two side parts in the radial direction and a pair of concave arc parts 28, 28 arranged in two side parts in the circumferential direction are formed to continue with each other. Also, the side surface of an engaging projection 19a formed on the back surface of a pressure plate 2b is structured in such a manner that a pair of flat surface parts 20c, 20d arranged in two side parts in the radial direction and a pair of convex arc surface parts 21, 21 arranged in two side parts in the circumferential direction are formed to continue with each other. And, the two flat surface parts 20c, 20d are inclined along the radial direction in a direction to approach each other as they go along the circumferential direction toward the opposite side (in FIG. 9, the right side) of the axis O of the piston 14a.

Also, in a state where the outside shim plate 4b exists at a neutral position with respect to the pressure plate 2b, between the flat surface parts 20c, 20d and two linear parts 27c, 27d opposed to each other in the radial direction, there are formed small clearances the with dimensions along the radial direction of which respectively change gradually along the circumferential direction; and, between the convex arc surface parts 21, 21 and the concave arc parts 28, 28 opposed to each other in the circumferential direction, there are formed clearances the width dimensions along the circumferential direction of which are relatively large. And, the inclination angle between the flat surface parts 20c, 20d and the two linear parts 27c, 27d opposed to each other in the radial direction through the small clearances is regulated in the range of 0°~15° (in the illustrated example, 1.5°).

In this embodiment having the above structure as well, in the braking time and braking removal time of the parking brake, the flat surface parts 20c, 20d and the two linear parts 27c, 27d can be line contacted with each other. Therefore, the disc brake pad assembly of this embodiment can effectively prevent the outside locking pieces 13d, 13e, 13f (see FIG. 1 and so on) constituting the outside shim plate 4b against plastic deformation and damage such as breakage.

The remaining structures and operation effects are similar to the above-mentioned first embodiment.

Third Embodiment

Figure 10:
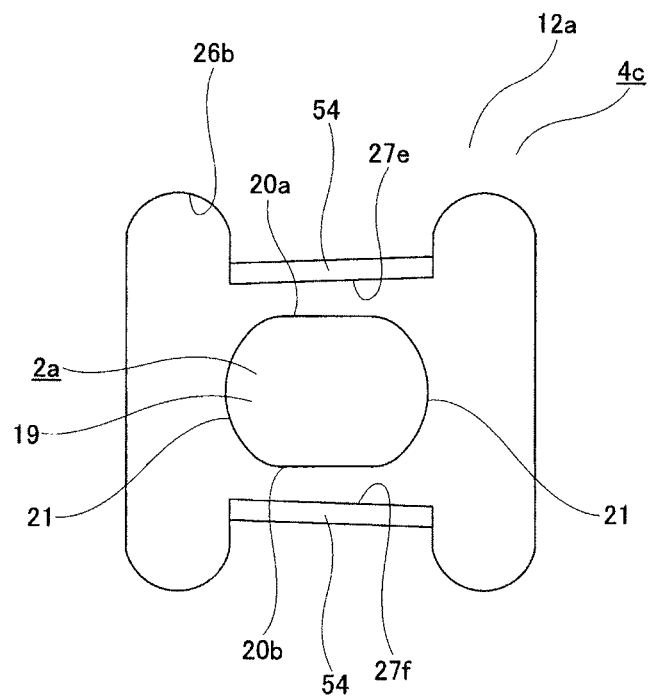
FIG. 10 is an enlarged view similar to FIG. 9 according to a third embodiment of the invention.
Figure 11:
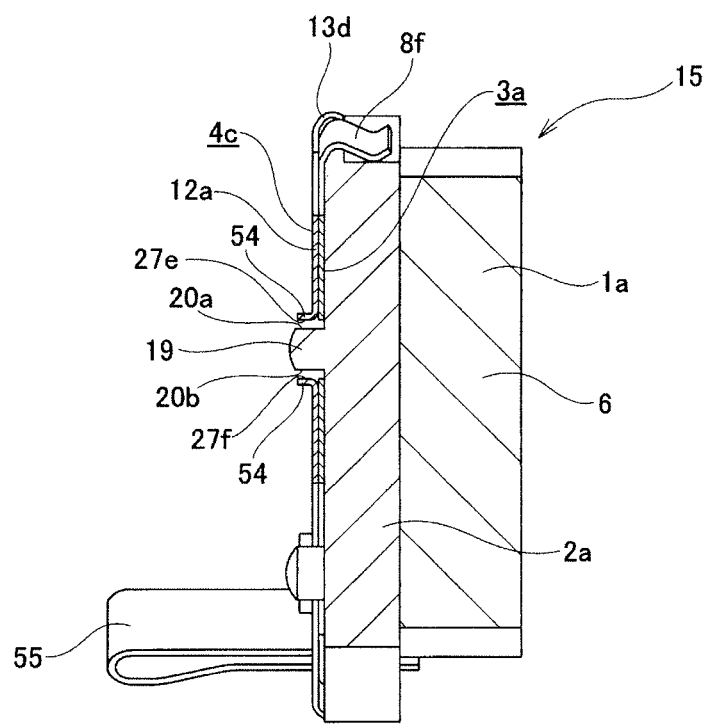
FIG. 11 is a section view corresponding to FIG. 5.
Figure 12:
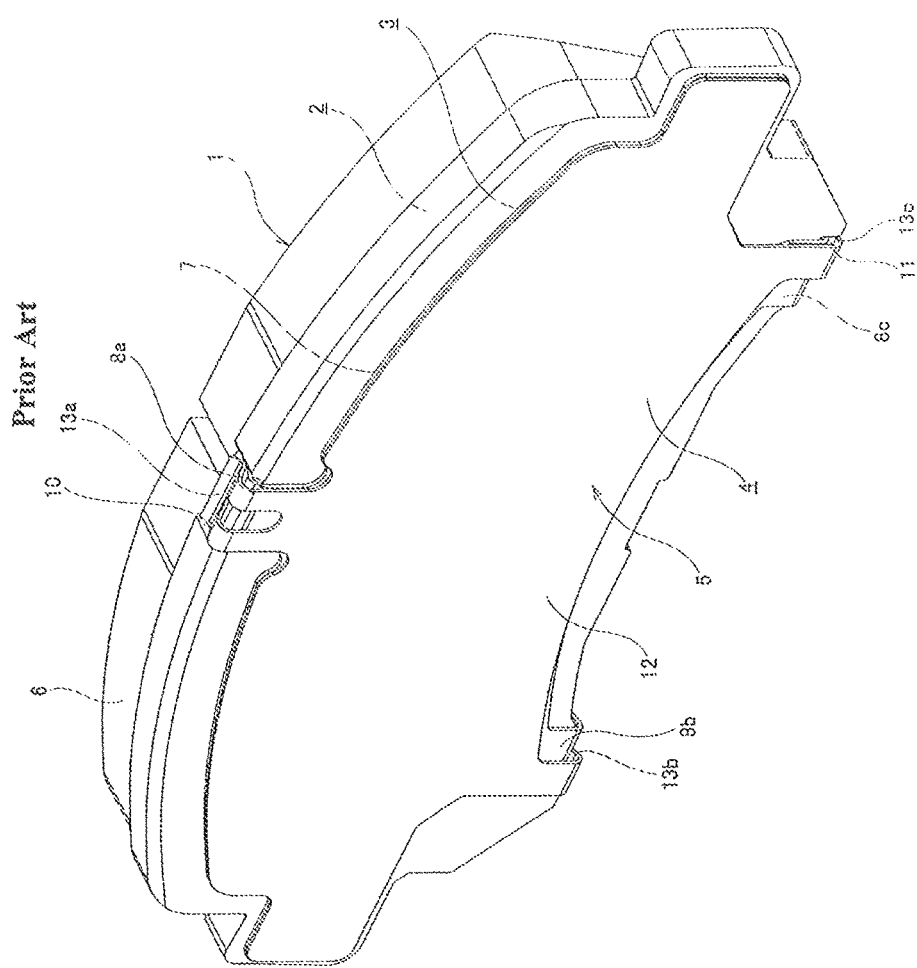
FIG. 12 is a perspective view of an example of a conventional structure, when a pad assembly is viewed from behind and radial-direction outside.
Figure 13:
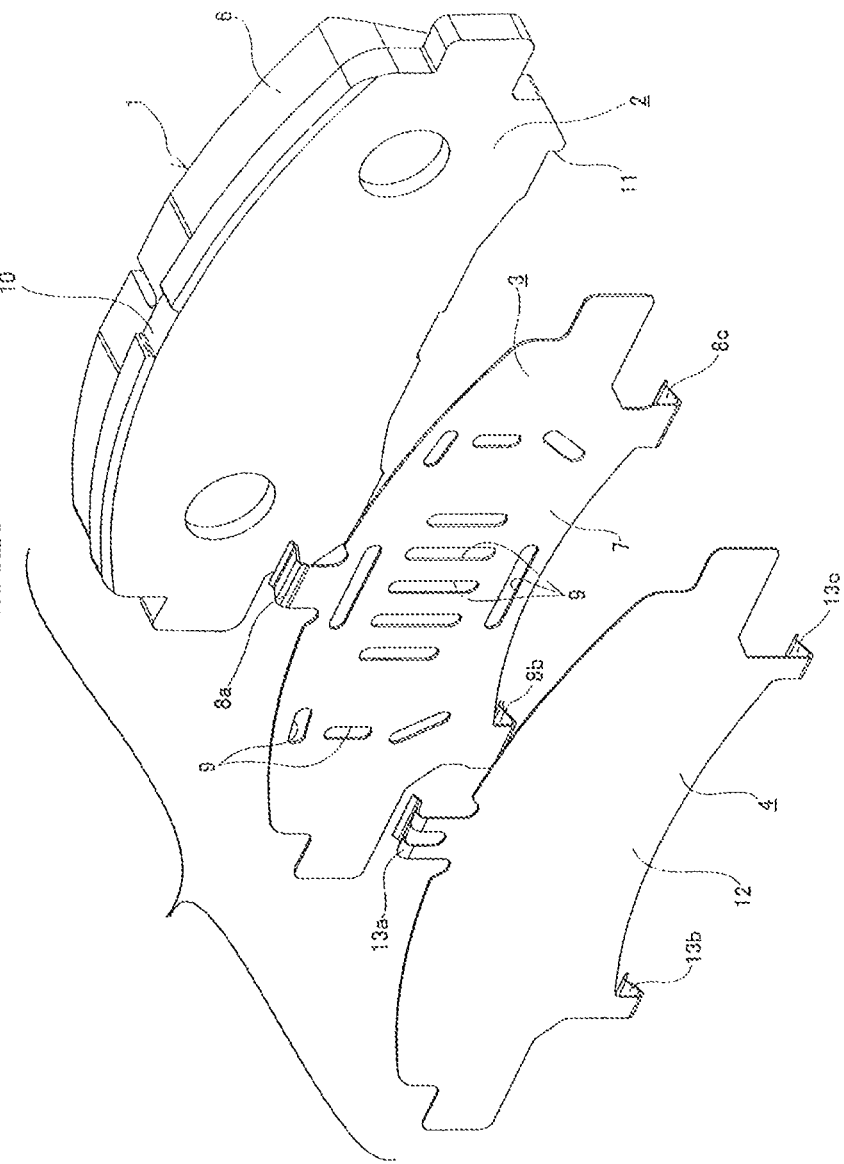
FIG. 13 is an exploded perspective view of the pad assembly shown in FIG. 12.
Figure 14:
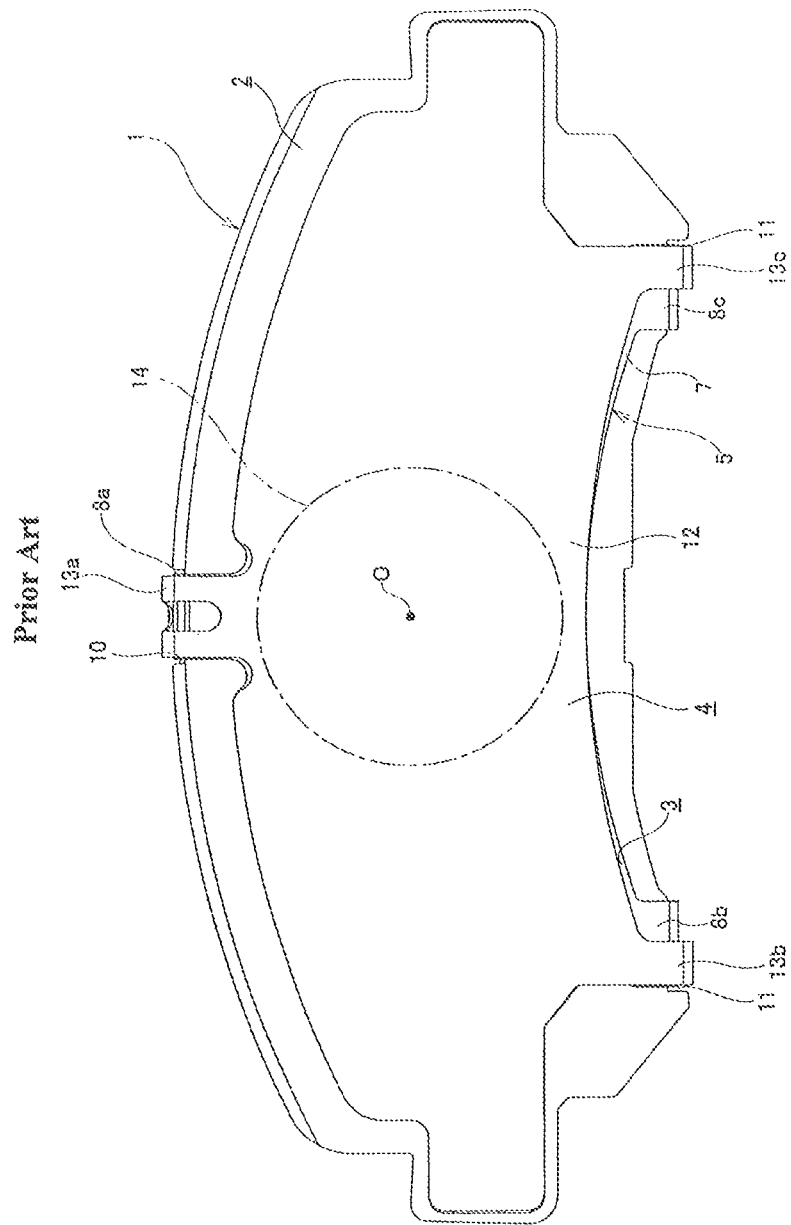
FIG. 14 is an orthographic view of the pad assembly shown in FIG. 12, when viewed from behind.

FIGS. 10 and 11 show a third embodiment of the invention. In this embodiment, in an outside main body 12a constituting an outside shim plate 4c, there is formed an engaging hole 26b having a substantially H-like shape. Also, of the inner peripheral edge of the engaging hole 26b, the radial-direction two side portions of the circumferential direction central part (the part the radial-direction width dimension of which is smaller than the circumferential direction two side portions) are respectively folded on the opposite side (in FIG. 11, on the left side) to the pressure plate 2a, thereby forming folded parts 54, 54 therein respectively. And, in this embodiment, the mutually opposed inside surfaces of the two folded parts 54, 54 function as linear parts 27e, 27f respectively. That is, in the braking time and braking removal time of the parking brake, flat surface parts 20a, 20b constituting the side surfaces of an engaging projection 19 and the linear parts 27e, 27f serving as the inside surfaces of the folded parts 54, 54 are line contacted with each other. Also, the linear parts 27e, 27f are inclined along the radial direction in a direction to approach each other as they go toward the inside (in FIG. 10, the left side) along the circumferential direction.

In this embodiment having the above structure, since the contact area between the flat surface parts 20a, 20b and the linear parts 27e, 27f can be secured large, contact surface pressures acting on these parts can be reduced. Thus, the disc brake pad assembly of this embodiment can prevent more effectively the side surfaces of the engaging projections 19 and the inner peripheral edges of the engaging holes 26b against serious wear or deformation.

The remaining structures and operation effects are similar to the above-mentioned first embodiment.

Here, the characteristics of the above-mentioned embodiments of the disc brake pad assembly of the invention are collectively described in brief.

[1] A disc brake pad assembly (15), comprising: a pad (1a) including a pressure plate (2a) with a lining (6) fixedly attached to the front surface thereof, and arranged opposed to the axial-direction side surface of a rotor (17); and, a shim plate (inside shim plate 3a, outside shim plate 4a) having a back surface to be pressed by the leading end face of a piston (14a), the shim plate (outside shim plate 4a) including a flat plate-shaped main body (outside main body 12a) and locking pieces (outside locking pieces 13d, 13e, 13f) folded from the peripheral edge of the main body (outside main body 12a) toward the pressure plate (2a) and, the locking pieces (outside locking pieces 13d, 13e, 13f) being engaged with the peripheral edge of the pressure plate (2a) in a state where the front surface of the main body (outside main body 12a) is superimposed directly or through the other shim plate (inside shim plate 3a) on the back surface of the pressure plate (2a), wherein the back surface of the pressure plate (2a) includes, in the part thereof shifted from the part thereof opposed to the leading end face of the piston (14a), an engaging projection (19) projecting in the axial direction of the rotor (17); the engaging projection (19) is inserted into an engaging hole (26) formed in such part of the main body (outside main body 12a) of the shim plate (outside shim plate 4a) as is shifted from the part thereof to be contacted with the leading end face of the piston (14a) in a state where flat surface parts (20a, 20b) constituting the side surface of the engaging projection (19) and linear parts (27a, 27b) constituting the inner peripheral edge of the engaging hole (26) are opposed to each other, and, with the shim plate (outside shim plate 4a) existing at a neutral position with respect to the pressure plate (2a), the flat surface parts (20a, 20b) and the linear parts (27a, 27b) are inclined to each other; of the shifting movement of the shim plate (outside shim plate 4a), the movement thereof in the circumferential direction of the rotor (17) is regulated by the engaged portions between the locking pieces (outside main body 12a) and the peripheral edge of the pressure plate (2a); and, of the rotation of the shim plate about the axis (O) of the piston (14a), the rotation in a direction to act on the piston (14a) at least in braking is regulated by line contact between the flat surface parts (20a, 20b) and the linear parts (27a, 27b).

[2] A disc brake pad assembly (15) according to the above [1] item, wherein, in a state where the shim plate (outside shim plate 4a) exists at a neutral position with respect to the pressure plate (2a), the inclination angle between the flat surface parts (20a, 20b) and the linear parts (27a, 27b) is in the range of 0° ~15°.

[3] A disc brake pad assembly (15) according to any one of the above [1] and [2] items, further including a folded part folded from the inner peripheral edge of the engaging hole (26) toward the opposite side to the pressure plate (2a), wherein the inside surface of the folded part is constituted of the linear parts (27a, 27b).

[4] A disc brake pad assembly (15) according to any one of the above [1] ~[3] items, wherein the engaging projection (19) is formed in such circumferential direction two side parts of the back surface of the pressure plate (2a) as are disposed across the part thereof opposed to the leading end face of the piston (14a), and the engaging hole (26) is formed in such circumferential direction two side parts of the main body (outside main body 12a) of the shim plate (outside shim plate 4a) as are disposed across the part thereof to be contacted with the leading end face of the piston (14a).

[5] A disc brake pad assembly (15) according to any one of the above [1]~[4] items, wherein a pair of flat surface parts (20a, 20b) are formed in the side surface of the engaging projection (19), a pair of linear parts (27a, 27b) are formed in the inner peripheral edge of the engaging hole (26), and the rotation of the shim plate in both directions about the axis (O) of the piston (14a) is regulated by line contact between the flat surface parts (20a, 20b) and the linear parts (27a, 27b).

[6] A disc brake pad assembly (15) according to any one of the above [1]~[5] items, wherein the locking pieces (outside locking pieces 13d, 13e, 130 are formed in the outer and inner peripheral edges of the main body (12a) at least apiece.

Here, the disc brake pad assembly of the invention is not limited to the above embodiments but can be modified or improved properly. Also, the materials, shapes, dimensions, number, arranging locations and the like of the respective composing elements of the above embodiments are not limitative but are arbitrary so long as they can attain the invention.

Also, the present application is based on the JPA (patent application No. 2014-118648) filed on Jun. 9, 2014 and thus the contents thereof hare incorporated herein for reference.

INDUSTRIAL APPLICABILITY

The number of shim plates constituting the disc brake pad assembly of the invention is not limited to 2. The invention can be enforced using only a single shim plate (excluding the inside shim plate from the structure of the embodiments), or, reversely, the invention can also be enforced using a structure in which the third shim plate (for example, the intermediate shim plate) is sandwiched between the pressure plate and inside shim plate or between the inside and outside shim plates. Also, the disc brake pad assembly of the invention is not limited to a floating type disc brake with an electric parking mechanism but can also be used while it is incorporated into electric disc brakes of various structures. Further, the number, forming positions and forming directions of the engaging projections and engaging holes are not limited to the illustrated embodiments but, so long as the effects of the invention can be provided, the structures of the embodiments can be properly combined with each other or can be changed properly.

DESCRIPTION OF REFERENCE NUMERALS AND SIGNS 1, 1a: Pad
2, 2a, 2b: Pressure plate
3, 3a: Inside shim plate (shim plate)
4, 4a, 4b: Outside shim plate (shim plate)
5: Combined shim plate
6: Lining
7, 7a: Inside main body
8a~8f: Inside locking pieces
9: Open hole
10, 10a: Locking concave part
11, 11a: Step
12, 12a: Outside main body (main body)
13a~13f: Outside locking pieces
14: Piston
15: Disc brake pad assembly
16: Disc brake with an electric parking mechanism
17: Rotor
18: Inside diameter side locking concave part
19, 19a: Engaging projection
20a~20d: Flat surface parts
21: Convex arc surface part
22: Locking folded part
23: Through hole
24: Locking open hole
25: Guide inclination part
26, 26a, 26b: Engaging hole
27a~27f: Linear part
28: Concave arc part
29: Locking projection piece
30: Support
31: Caliper
32: Caliper pawl part
33: Cylinder part
34: Conversion mechanism
35: Male screw part
36: Spindle
37: Female screw part
38: Nut
39: Male spline part 40: Cylindrical part
41: Female spline part
42: Flange part
43: Bottom part
44: Thrust needle bearing
45: Communication hole
46: Casing
47: Female spline hole
48: Intermediate shaft
49: Seal groove
50: Annular seal member
51: Dust cover
52: Convex curved surface part
53: Chamfer part
54: Folded part
55: Wear indicator

The invention claimed is:

1. A pad assembly for a disc brake, the pad assembly comprising:
    a pad in which a lining is fixedly attached to a front surface of a pressure plate, and which is to be arranged to face an axial-direction side surface of a rotor; and
    a shim plate having a back surface to be pressed by a leading end face of a piston,
    wherein the shim plate includes a flat plate-shaped main body and a locking piece folded from a peripheral edge of the main body toward the pressure plate,
    wherein the locking piece is engaged with a peripheral edge of the pressure plate in a state where a front surface of the main body is superimposed directly or through another shim plate on a back surface of the pressure plate,
    wherein the pressure plate includes, in a part of the back surface of the pressure plate which is shifted from a part of the pressure plate opposed to the leading end face of the piston, an engaging projection projecting in an axial direction of the rotor,
    wherein the engaging projection is inserted into an engaging hole formed in a part of the main body of the shim plate which is shifted from a part of the main body to be contacted with the leading end face of the piston in a state where a flat surface part of the engaging projection constituting a side surface of the engaging projection and a linear part of the engaging hole constituting an inner peripheral edge of the engaging hole are opposed to each other and where the flat surface part and the linear part are inclined to each other with the shim plate existing at a neutral position with respect to the pressure plate,
    wherein, of shifting movements of the shim plate relative to the pressure plate, a movement of the shim plate in a circumferential direction of the rotor is regulated by an engagement between the locking piece and the inner peripheral edge of the pressure plate,
    wherein, of a rotation of the shim plate about an axis of the piston, a rotation in a direction to act on the piston at least in braking is regulated, by a line contact between the flat surface part and the linear part, and
    wherein, in a state where the shim plate exists at the neutral position with respect to the pressure plate, an inclination angle between the flat surface part and the linear part is in the range of 0° to 15°.

2. The pad assembly for a disc brake according to claim 1, wherein the engaging projections are formed on the back surface of the pressure plate in both sides in the circumferential direction across the part of the pressure plate opposed to the leading end face of the piston, and
    wherein the engaging holes are formed on the main body of the shim plate in both sides in the circumferential direction across the part of the main body to be contacted with the leading end face of the piston.

3. The pad assembly for a disc brake according to claim 1, wherein a pair of flat surface parts are formed in the side surface of the engaging projection, a pair of linear parts are formed in the inner peripheral edge of the engaging hole, and the rotation of the shim plate in both directions about the axis of the piston is regulated by line contact between the flat surface parts and the linear parts.

4. The pad assembly for a disc brake according to claim 1, wherein the locking pieces are formed in outer and inner peripheral edges of the main body at least apiece.

5. A pad assembly for a disc brake, the pad assembly comprising:
    a pad in which a lining is fixedly attached to a front surface of a pressure plate, and which is to be arranged to face an axial-direction side surface of a rotor;
    a shim plate having a back surface to be pressed by a leading end face of a piston,
    wherein the shim plate includes a flat plate-shaped main body and a locking piece folded from a peripheral edge of the main body toward the pressure plate,
    wherein the locking piece is engaged with a peripheral edge of the pressure plate in a state where a front surface of the main body is superimposed directly or through another shim plate on a back surface of the pressure plate,
    wherein the pressure plate includes, in a part of the back surface of the pressure plate which is shifted from a part of the pressure plate opposed to the leading end face of the piston, an engaging projection projecting in an axial direction of the rotor,
    wherein the engaging projection is inserted into an engaging hole formed in a part of the main body of the shim plate which is shifted from a part of the main body to be contacted with the leading end face of the piston in a state where a flat surface part of the engaging projection constituting a side surface of the engaging projection and a linear part of the engaging hole constituting an inner peripheral edge of the engaging hole are opposed to each other and where the flat surface part and the linear part are inclined to each other with the shim plate existing at a neutral position with respect to the pressure plate,
    wherein, of shifting movements of the shim plate relative to the pressure plate, a movement of the shim plate in a circumferential direction of the rotor is regulated by an engagement between the locking piece and the inner peripheral edge of the pressure plate, and
    wherein, of a rotation of the shim plate about an axis of the piston, a rotation in a direction to act on the piston at least in braking is regulated by a line contact between the flat surface part and the linear part; and
    a folded part folded at the inner peripheral edge of the engaging hole in a opposite direction from the pressure plate, wherein an inside surface of the folded part serves as the linear part.

* * * * *